June 11, 1968  H. SOBOTA  3,387,896
ANTISKID AND TIRE PROTECTIVE CHAIN
Filed Feb. 9, 1966  11 Sheets-Sheet 1

Inventor:
Herbert Sobota
By
Walter Becky

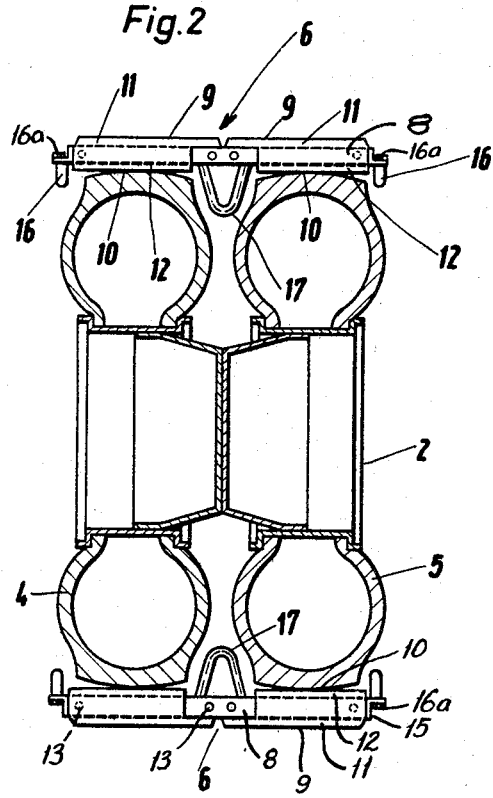

June 11, 1968 H. SOBOTA 3,387,896
ANTISKID AND TIRE PROTECTIVE CHAIN
Filed Feb. 9, 1966 11 Sheets-Sheet 3
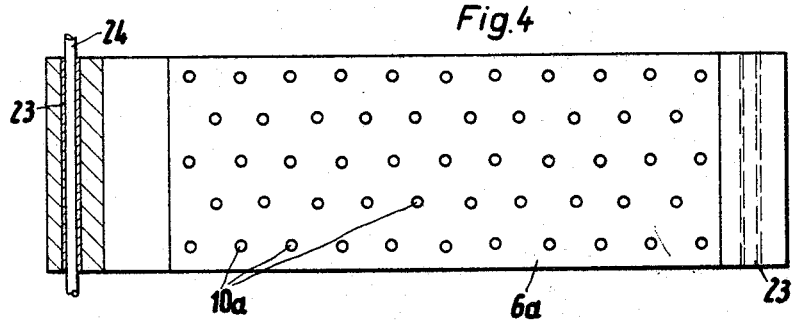
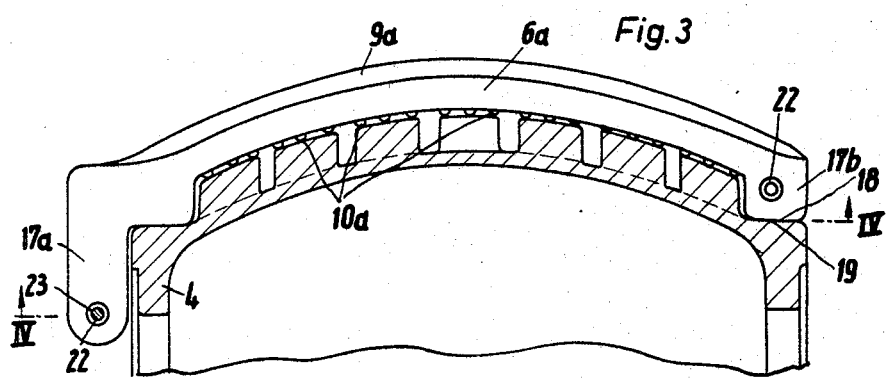
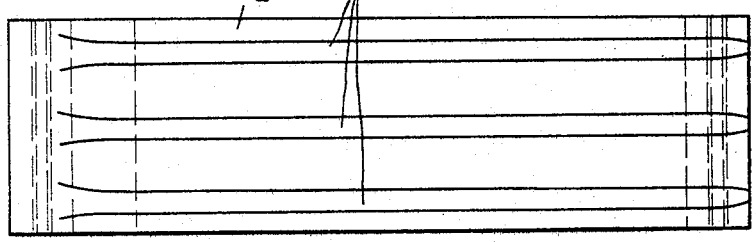
Inventor:
Herbert Sobota
By

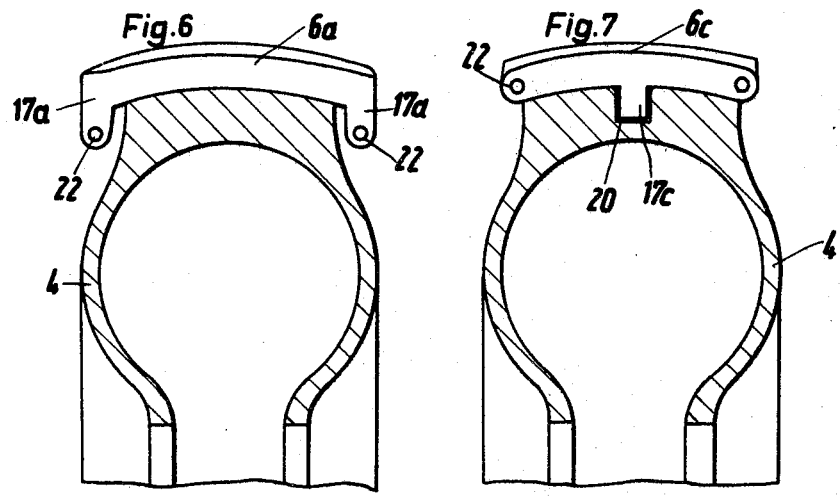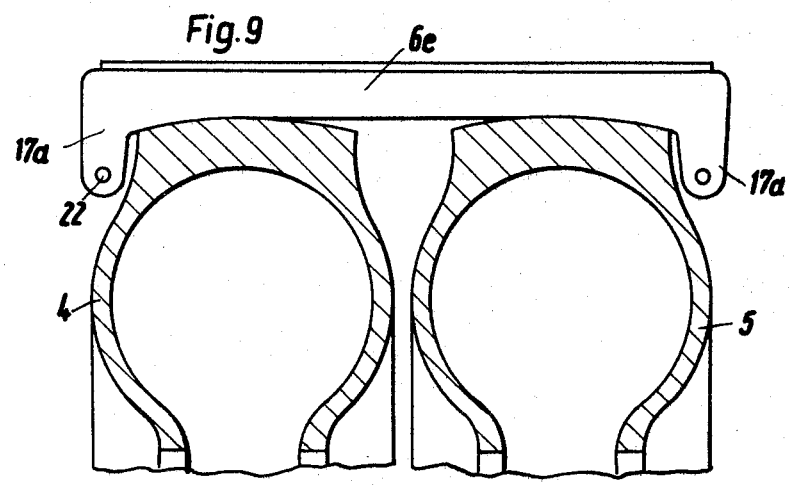

June 11, 1968   H. SOBOTA   3,387,896
ANTISKID AND TIRE PROTECTIVE CHAIN
Filed Feb. 9, 1966   11 Sheets-Sheet 5

Inventor:
Herbert Sobota
By Walter Becker

June 11, 1968    H. SOBOTA    3,387,896
ANTISKID AND TIRE PROTECTIVE CHAIN
Filed Feb. 9, 1966    11 Sheets-Sheet 6
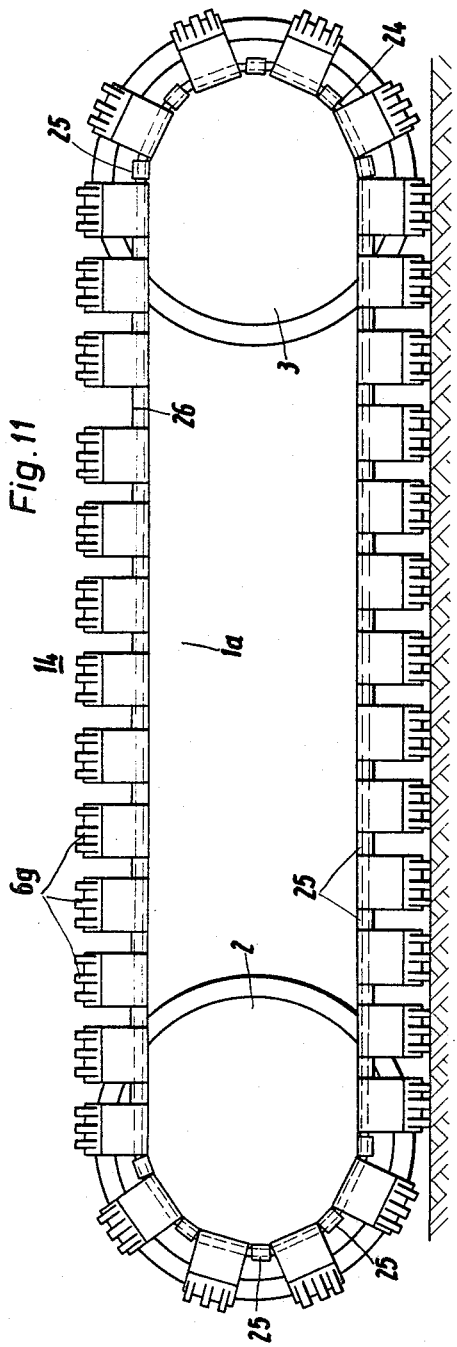
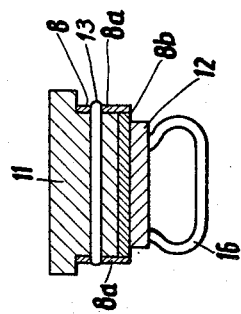
Inventor:
Herbert Sobota
By June 11, 1968 H. SOBOTA 3,387,896
ANTISKID AND TIRE PROTECTIVE CHAIN
Filed Feb. 9, 1966 11 Sheets-Sheet 8

Inventor:
Herbert Sobota
By

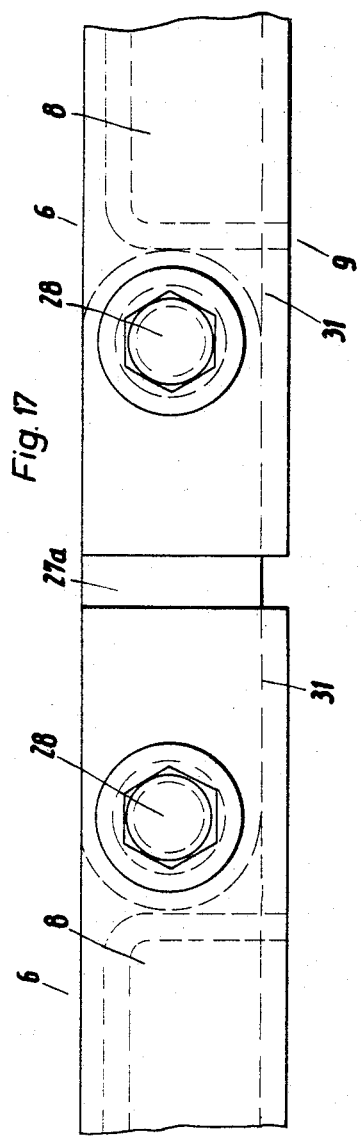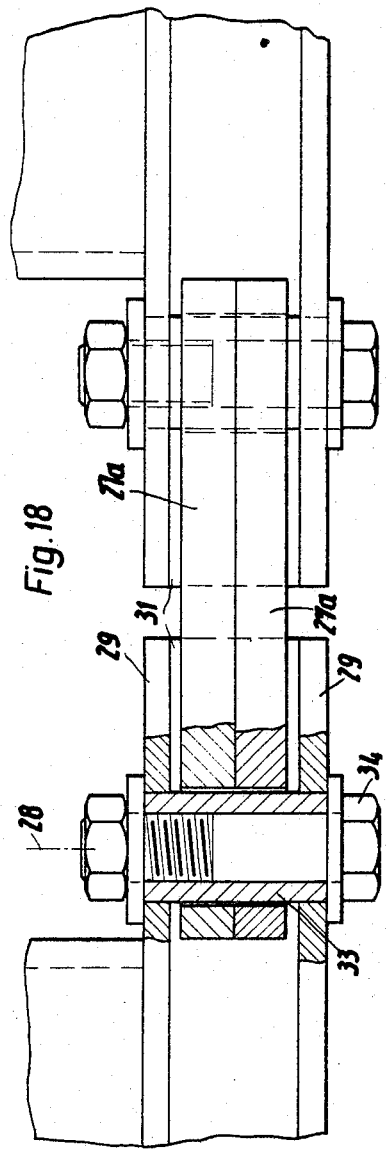

June 11, 1968  H. SOBOTA  3,387,896
ANTISKID AND TIRE PROTECTIVE CHAIN
Filed Feb. 9, 1966  11 Sheets-Sheet 10
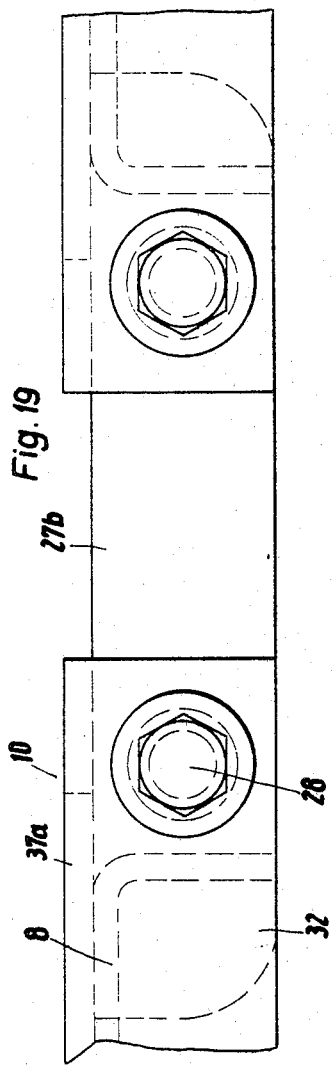
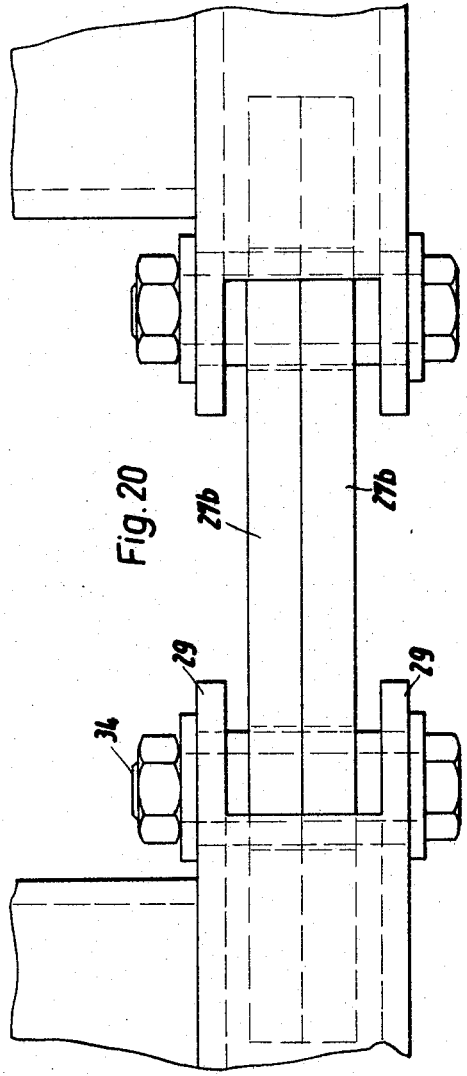
Inventor:
Herbert Sobota
By
Walter Becker

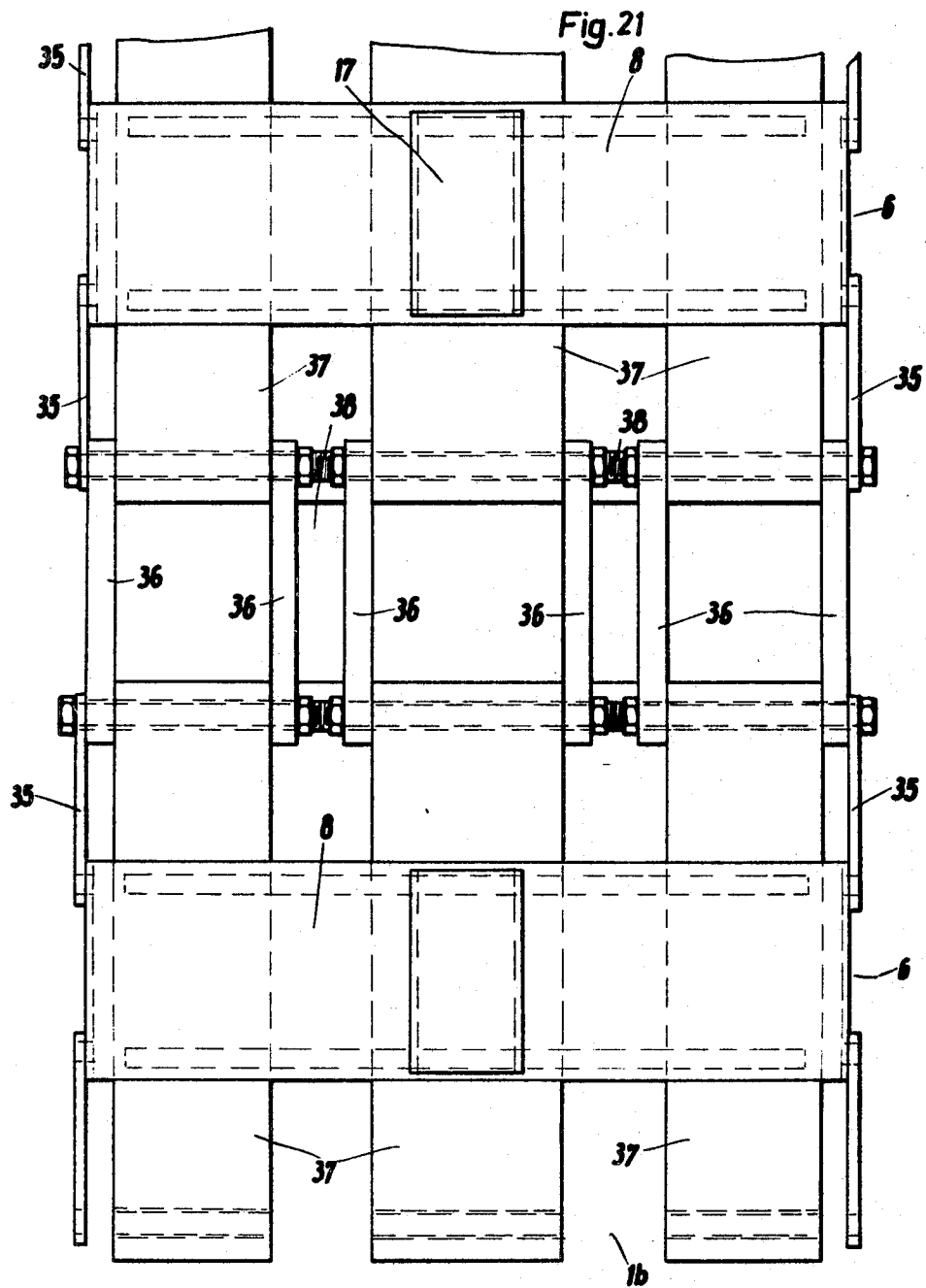

3,387,896
ANTISKID AND TIRE PROTECTIVE CHAIN
Herbert Sobota, Aalen, Germany, assignor to Eisen- und
Drahtwerk Erlau AG, Aalen, Wurttemberg, Germany
Filed Feb. 9, 1966, Ser. No. 526,099
Claims priority, application Germany, Feb. 11, 1965,
E 28,676
8 Claims. (Cl. 305—35)

The present invention relates to an antiskid and tire protective chain for wheels arranged one behind the other of motor vehicles in which the said chain comprises a plurality of individual gripping links linked to each other and partially composed of elastic material.

Heretofore known antiskid and tire protective chains of the above mentioned type have the drawback that their employment is in most instances limited. In most instances chains of this type consist entirely of metal so that they cannot be used on highways because they would damage the same. Other heretofore known antiskid and tire protective chains of the above mentioned character, while having their running side covered with rubber, are not laterally guided in a stable manner. In most instances the lateral guiding means consist of metal and are so dimensioned that they cannot be employed for all tires or rims of vehicles because such rims frequently consist of light metal which is destroyed or damaged by the said lateral guiding means.

Another drawback inherent to heretofore known antiskid and tire protective chains of the type involved consists in that the connection of the individual gripper links with each other is effected by screws, rivets, or the like, which fact calls for a rather awkward and therefore expensive assembly work.

Other heretofore known antiskid chains for vehicle wheels arranged one behind the other have the drawback that they are flexible from their stretched position into both possible directions whereby that part of the chain which is located between the two wheels provided with a common antiskid chain will evade the uneveness of the road so that that part of the chain which is located between the said two wheels will not exert a sufficient grip.

It is, therefore, an object of the present invention to provide an antiskid and tire protective chain of the above mentioned general character, which will overcome the drawbacks outlined above.

It is another object of this invention to provide an antiskid and tire protective chain which will be easy on the tire on which the chain is mounted and also on the roads over which the chain-equipped wheels move.

It is a further object of this invention to provide an antiskid and tire protective chain of the above mentioned character, which will be effectively laterally guided so that it will not run off the tire.

It is also an object of this invention to provide a chain of the type set forth above, which will be suitable for varying use, can easily be mounted and unmounted and will be simple in assembly.

It is a further object of this invention to provide a chain of the above mentioned type in which the individual parts can easily be exchanged and replaced whenever desired.

Still another object of this invention consists in the provision of a chain of the type set forth in the preceding paragraphs, in which that part of the chain which is located between the wheels arranged one behind the other cannot be pressed away from the tread surface of the tires.

These and other objects and advantages of the invention will appear more clearly from the following specification in connection with the accompanying drawings, in which:

FIG. 1 diagrammatically illustrates a view of an antiskid and tire protective chain according to the present invention.

FIG. 2 is a section taken along the line II—II of FIG. 1.

FIG. 3 is a modified design of an antiskid chain according to the present invention.

FIG. 4 is a section taken along the line IV—IV of FIG. 3 through a gripper link.

FIG. 5 is a top view of FIG. 3.

FIGS. 6 to 10 respectively illustrate further embodiments of gripper links shown in section similar to the section of FIG. 3.

FIG. 11 is a view of an antiskid and tire protective chain with gripper links according to FIGS. 3 to 10.

Figure 12:
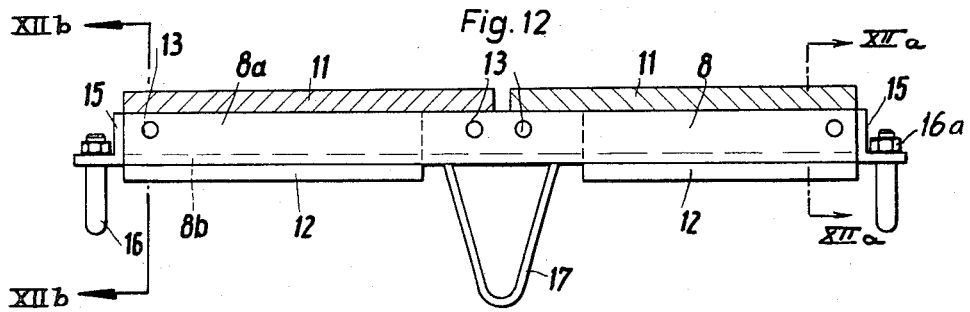
Figure 13:
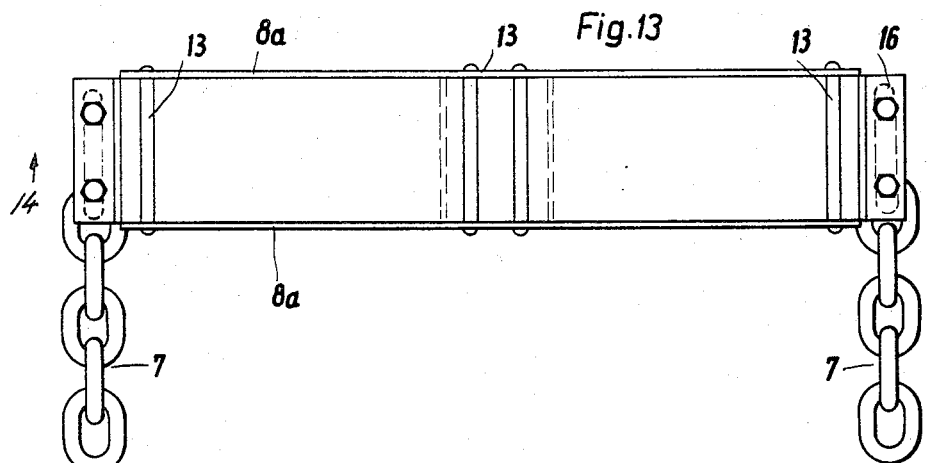
Figure 14:
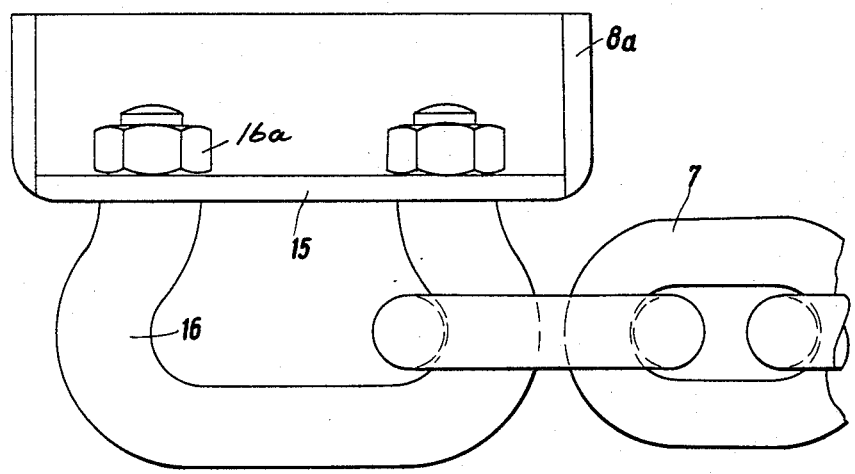

FIGS. 12 to 14 respectively represent in view, top view and side view a further modification of a gripper link according to the present invention.

Figure 12A:
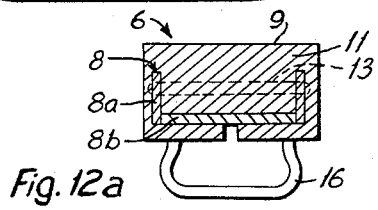

FIG. 12a is a section along the line XIIa—XIIa of FIG. 12.

FIG. 12b is a section along the line XIIb—XIIb of FIG. 12.

Figure 15:
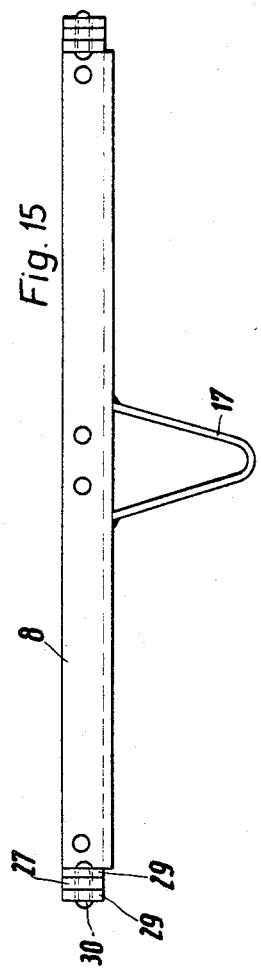
Figure 16:
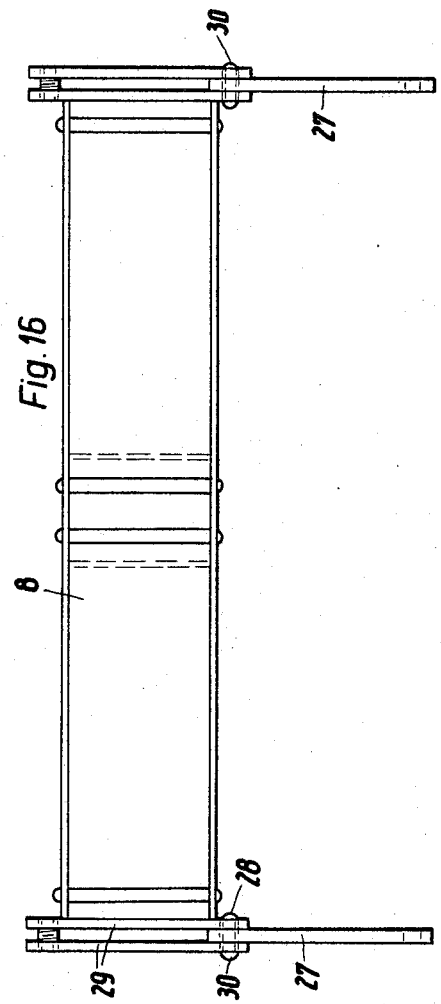

FIGS. 15 and 16 illustrate a gripper link according to FIGS. 12 and 13 but with different connecting elements.

FIGS. 17 and 18 respectively illustrate in view and top view a further embodiment of a connecting element interconnecting two gripper elements.

Figure 1:
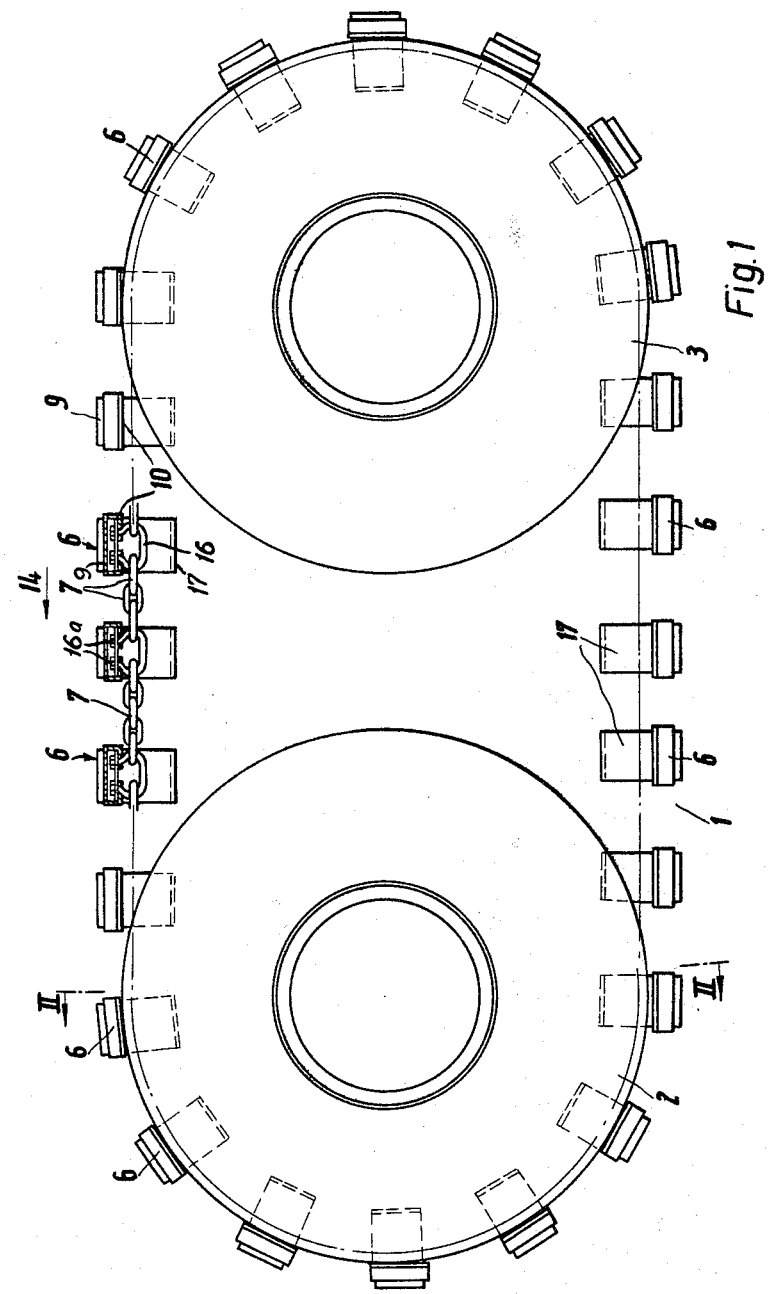

FIGS. 19 and 20 show a further modification over the arrangement of FIGS. 1 and 18.

FIG. 21 is a cutout of an antiskid chain equipped with gripper links according to FIG. 15.

An antiskid and tire protective chain which is intended for motor vehicle wheels arranged one behind the other and which comprises individual gripper members linked to each other and partially consisting of elastic material is characterized in that the tread surface as well as the tire engaging surface of the gripper members consist of elastic material, such as rubber, synthetic material, or the like.

A chain of this type makes it possible to drive on sensitive roads without damaging the same. In view of the elastic engagement of the antiskid or tire protective chain with the tire, it will be assured that the tires will not be damaged and will wear only to a minor extent. The tire engaging surfaces of elastic material furthermore assure a safe power flow between the antiskid chain and the tires so that also with a high torque to be converted by the tires to the chain, no or only a very slight slip will occur.

According to a further feature of the invention, the gripper members consist entirely of elastic material whereby a simple and low cost manufacture of the antiskid and tire protective chain will be assured. The gripper members made of solid rubber will in view of their high elasticity be suitable for use on hard and uneven ground, as for instance rocks.

According to a further development of the present invention, the gripper members are provided with lateral guiding profiles which rest upon the motor vehicle wheel and by which the said chain is prevented from laterally running off the respective tire. Advantageously, the lateral guiding means consist of plates which laterally extend over the tires in approximately radial direction and advantageously form a single piece with the gripper members made of solid rubber, while said lateral guiding means together with said gripper members form a U-shaped member. These lateral guiding profiles are particularly suitable for customary vehicle tires. When the antiskid and tire protective chain is employed for tires with a laterally offset shoulder, the plates will have that end face thereof which faces toward the tire axis provided with the said shoulder. In this way the antiskid and tire protective chain can be so designed that in axial direction of the tire it will have the same width or a width less than the said tire. This narrow design of the antiskid and tire protective chain, which is particularly suitable for motor vehicles with a relatively small dimensioned gear box, can also be realized by forming the lateral guiding profiles by at least one web member which extends in the longitudinal direction of the chain and is located between the outside of the gripper member, preferably symmetrically with regard to the tire center and preferably forming a single piece with the gripper member. The said web engages a corresponding circumferential groove of the tire so that the antiskid and tire protective chain will not be displaceable transverse to the tire. In view of the lateral guiding web located in the center of the gripper members, it is possible for the soil or dirt which during operation of the chain enters between the said chain and the tire and by which the power transmission between chain and tire is affected, to evade outwardly toward the tire lateral surfaces. It is particularly advantageous to have the web designed with a dovetail contour and in engagement with a rectangular cross-sectional groove of the motor vehicle tire. When the tire is under load, the said groove deforms at the respective area where the tire will be under load whereby said groove will firmly embrace the dovetail-shaped web of the respective tire link.

When a vehicle is provided with coaxially arranged twin tires, the lateral guiding web is advantageously located between the said two tires.

Referring now to the drawings in detail, FIGS. 1 and 2 show a tire protective chain 1 for two wheels 2 and 3 arranged one behind the other which wheels may for instance be motor vehicle wheels. Each of the wheels 2 and 3 represents a twin wheel comprising two individual tires 4 and 5 (FIG. 2).

The antiskid and tire protective chain according to the present invention as illustrated in FIGS. 1 and 2 comprises individual gripper members 6 which are interconnected by chain sections 7 and which extend over both individual tires 4 and 5 of the respective twin wheel. The gripper members 6 are formed by a frame 8 which is illustrated in detail in FIGS. 2 and 13 and which comprises members 11 and 12 of elastic material, as for instance rubber, or synthetic material, for example polyurethane. These members 11, 12 form the running surface 9 and the tire engaging surface 10 of the chain 1. In the embodiment illustrated in FIGS. 1 and 2, each gripper member 6 has associated therewith two adjacent elastic members 11, 12, while the running surface 9 and the tire engaging surface 10 pertaining to one and the same tire are formed by a single piece which is detachably connected to frame 8 by pins 13. Pins 13 extend in the longitudinal direction of the arrow 14 of chain 1 and are arranged in struts 8a of frame 8 which struts extend transverse to and over the tires 4, 5 and which are guided by corresponding recesses in the elastic parts 11, 12. The bottom of frames 8, in other words that side of frames 8 which faces the tires 4, 5, is closed by a bottom plate 8b. The elastic members 11, 12 extend around frame 8 in the longitudinal direction of arrow 14 of chain 1 at the front and at the rear, said members 12 comprising the tire running surface 10. Member 11 located between the elastic members 12 and comprising the running surface 9 rests in frame 8 and more specifically on bottom plate 8b.

The outside of frame 8 is provided with angle irons 15 having connected thereto yokes or ears 16 (FIGS. 12 to 14), preferably by means of nuts 16a.

Each of these yokes 16 has suspended therein two chain members 7.

As shown in FIGS. 1, 2 and 12, 13, frames 8 of chain 1 have connected thereto lateral guiding members 17 which formed by V-shaped sheet metal webs 17 which enter between the two individual tires 4, 5 of the twin tires. In view of these sheet metal webs 17, the antiskid and tire protective chain 1 can displace itself only slightly in the axial direction of the tires 4, 5 so that it cannot run off the tires. Yokes 16 of frame 8 in which the chain members 7 are suspended form additional lateral guiding means on the outer lateral surfaces of the tires 4, 5. The tire engaging surface 10 of gripper members 6 which surface is formed of elastic material assures a power transmission between tires 4, 5 and chain 1. The running surface 9 of the gripper members 6 which consists of elastic material permits the employment of chain 1 also on streets without damaging the same.

FIGS. 3 to 5 illustrate a gripper member 6a of solid rubber. The tire engaging surface 10a of gripper member 6a is formed by protrusions which are distributed over the inner surface of gripper member 6a. Running surface 9a of gripper member 6a is formed by gripper webs 9a which extend transverse to and over tire 4. These gripper webs 9a assure a safe grip of chain 1 on the ground even if the latter should be somewhat yieldable.

As will be evident from FIG. 3, gripper member 6a of solid rubber has two different lateral guiding members 17a and 17b arranged on the outer sides of gripper member 6a. Lateral guiding member 17a extends over the side surface of tire 4 in the direction toward the axis of tire 4 whereas the other lateral guiding member 17b is shorter than member 17a and by means of its end face 18 rests on a corresponding shoulder 19 of tire 4. A corresponding support is also provided for lateral guiding member 17a. As illustrated in FIG. 3, lateral guiding member 17b which rests on shoulder 19 does not extend beyond the corresponding lateral surface of the tire so that gripper member 6a will also be suitable for relatively small dimensioned gear boxes of motor vehicles. However, gripper member 6a may, if desired, on both sides be provided with lateral guiding members 17a and 17b. According to the specific embodiment illustrated in FIG. 6, the gripper member 6a has two lateral guiding members 17a which extend beyond the lateral surface of tire 4 and together with the gripper member form a U-shaped part.

Figure 8:
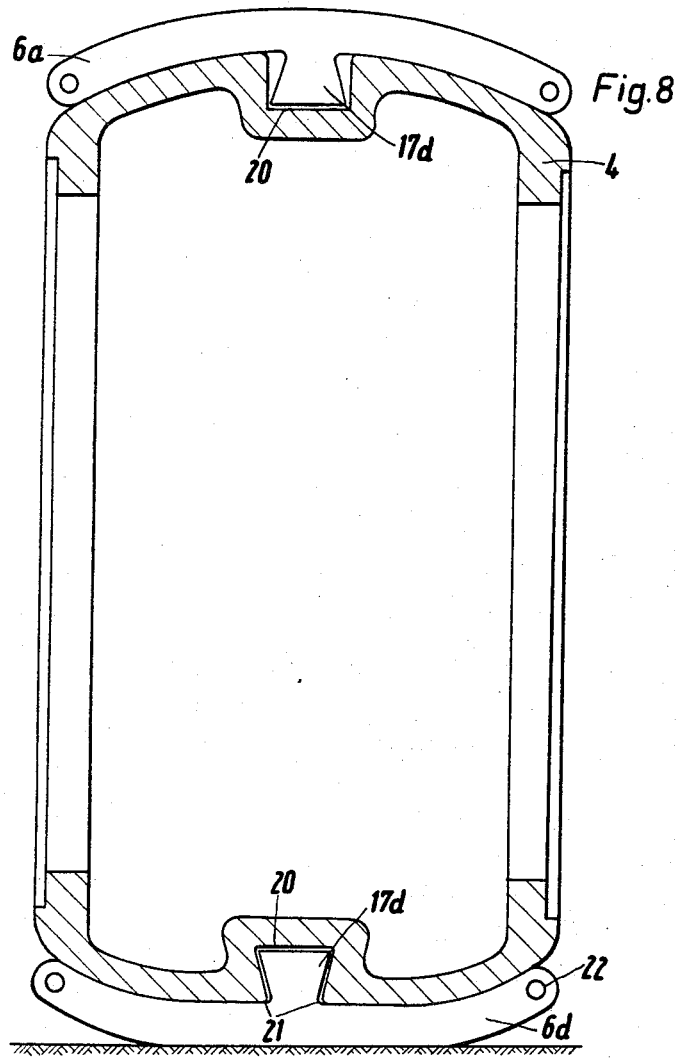

According to the embodiment shown in FIGS. 7 and 8, the gripper members 6c and 6d have lateral guiding members in the form of webs 17c, 17d which are symmetrically arranged between the outer side of the gripper members 6c, 6d. The tires 4 according to FIGS. 7 and 8 have a circumferential groove 20 of rectangular cross section in which the lateral guiding webs 17c, 17d are guided. Whereas according to the embodiment of FIG. 7 the cross section of the lateral guiding web 17c corresponds to the cross section of groove 20, with the arrangement of FIG. 8 the lateral guiding web 17d has a dovetailed contour, and the guiding groove 20 has a rectangular cross section. As will be seen from the lower portion of FIG. 8, tire 4 deforms within the range of that portion which rests against the ground in such a way that the outer marginal portions 21 of guiding groove 20 are pressed toward each other so as to be pressed against the lateral flanks of the dovetailed lateral guiding web 17d. The greater the load acting on tire 4, the higher will be said pressing force so that the power transmission between tire 4 and gripper member 6d will increase with increasing load on the tire.

Figure 10:
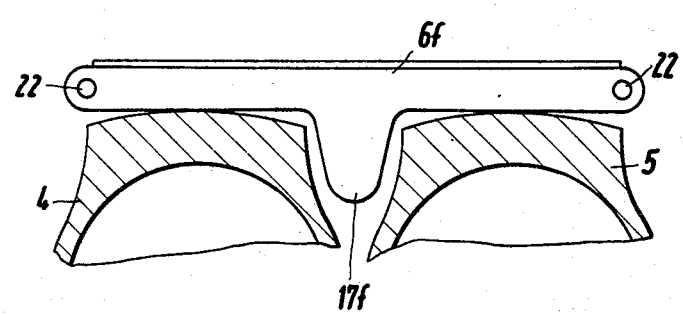

The gripper member 6e of FIG. 9 corresponds to that of FIG. 6 but is so wide that it is suitable for employment on a twin tire 4, 5. Gripper member 6f according to FIG. 10 is provided with a lateral guiding web 17f symmetrically located between the outer lateral surfaces of the twin tire. Lateral guiding web 17f, similar to lateral guiding web 17 of FIGS. 1 and 2, enters between the two tires of the twin tire 4, 5 and in this way guides the antiskid and tire protective chain in the axial direction of the tire 4, 5.

FIG. 11 illustrates the antiskid and tire protective chain 1a in mounted condition in which the gripper members 6g are exclusively of elastic material, such as rubber material, synthetic material, as for instance polyurethane, or the like. As will be seen from FIGS. 3 to 10, the gripper members 6a, 6c, etc., consisting of solid rubber or similar materials, are provided with recesses 22 which extend in the longitudinal direction of the arrow 14. These recesses are arranged at the left and at the right on the outer lateral surfaces of the gripper members 6a, 6c, etc., while the gripper members 6a, 6e of FIGS. 3 to 6 and 9, which have laterally outwardly located lateral guiding members 17a, 17b, have the said recesses 22 located in the lateral guiding members 17a, 17b. The recesses 22 in the gripper members 6a, 6c, 6d, 6f and 6e are formed by bushings 23, preferably of steel, which are embedded in the said gripper members. As shown in FIG. 11, the gripper members 6g are provided with recesses 22 in two steel cables 24 located laterally of tires 2, 3. Between each two gripper members 6g there is provided a spacer member formed by a steel bushing 25 or a similar element. Due to this arrangement, the antiskid and tire protective chain will be light in weight and very flexible and can easily be repaired. When producing or repairing such chain, the individual gripper members 6g have merely to be threaded on cables 4 while inserting the spacer bushings 25. The two ends of each cable 24 are connected with a cable closure 26 by means of which the antiskid and tire protective chain is closed.

FIGS. 15 and 16 illustrate a metallic frame 8 according to FIGS. 12 and 13. With this embodiment, metal frame 8 instead of being provided with lateral chain yokes 16 is equipped with tiltably arranged plates or links 27 which are each tiltable about an axis 28 transverse to the longitudinal direction of the arrow 14 of the chain, said plates or links 27 being tiltably connected to frame 8. By means of these links 27, the individual gripper members 6 are interconnected and assure a great resistance of chain 1 against twisting. Links 27 are by means of rivets 30 or the like pivotally journalled between each two frame members 29 of frame 8.

A further development of the arrangement of FIGS. 15 and 16 is illustrated in FIGS. 17 and 18. As will be seen from FIGS. 17 and 18, the links 27a which interconnect the two frames 8 of two gripper members 6 are so arranged that they can be tilted about the respective tilting axis 28 away from the running surface 9. To this end, frames 8 are between the frame members 29 provided with a plate 31 interconnecting these two parts. When the chain 1 is in its stretched out position, link 27a will with its end face on the longitudinal side thereof engage the said plate 31. This arrangement has the advantage that those parts of chain 1 which engage the ground and are located between the two wheels 2, 3 cannot evade the unevenness of the ground in upward direction but will retain their stretched out position similar to a board and therefore will assure a safe grip.

A similar embodiment is illustrated in FIGS. 19 and 20. According to this embodiment, however, the links 27 extend beyond the tilting axes 28. The thus formed arms 32 of links 27b serve as abutment having associated therewith corresponding abutment plates 31a on frame 8. These abutment plates 31a are provided on that side of frame 8 which faces the tire engaging surface 10.

As will furthermore be evident from FIGS. 17 to 20, two links 27a, 27b arranged alongside each other are provided for each connecting member, said links 27a, 27b being tiltably journalled on bushings 33. Bushings 33 are by means of screws 34 detachably connected to the lateral frame members 29. The distance of frame members 29 from each other is somewhat greater than the corresponding width of the total of the two links 27a, 27b so that said links are able to displace themselves in the direction of their tilting axes 28 on bushings 33.

FIG. 21 illustrates a section of an antiskid and tire protective chain 1b of which the gripper members 6 are pivotally interconnected by means of links 35 and 36. Frames 8 are each by means of four links 35 linked to the elastic members 37 associated therewith and forming the running surface and the tire engaging surface. At those places at which links 36 are linked to the elastic members 37, there are also linked further links 36 which establish pivotal connection with the elastic members 37 of the next gripper member 6. With the embodiment illustrated in FIG. 21, there are for each frame 8 provided three elastic members 37 which are arranged in spaced relationship to each other alongside each other. Within the range of its outer sides, frame 8 is by means of two links 35 each linked to the elastic members 37, whereas each elastic member 37 has two connecting links 36 linked thereto. The connecting links 36 which are arranged in the center and located alongside each other are rigidly interconnected by means of plates 38 or the like welded thereto.

It is, of course, to be understood that the present invention is, by no means, limited to the particular embodiments shown in the drawings and described above, but also comprises any modifications within the scope of the appended claims.

I claim:

1. Antiskid chain for two motor vehicle wheel means arranged in tandem and equipped with tires which comprises; spaced individual gripper links, each link comprising a generally rectangular rigid box-like supporting frame extending transversely to the respective tire, elastic means carried by said frame and including an outer road engaging portion and an inner tire tread engaging portion, said frame comprising a substantially flat base member on the tread side with end walls and side members upstanding from said base member, said road engaging portion resting on said base member and projecting above the upper edges of said end walls and side members, said tire tread engaging portion resting on said base plate and projecting inwardly therefrom, removable connecting means connecting said elastic means to said frame, elements dependent inwardly beyond said tire tread engaging portions from said frame at the lateral sides thereof, and flexible means interconnecting each said element on each frame with the said elements on the corresponding end of the next adjacent frames.

2. An antiskid chain according to claim 1 in which each said frame is of a length in the lateral direction to span both of the tires on a set of dual wheels and each said wheel means comprising dual wheels.

3. An antiskid chain according to claim 2 in which each said frame includes a member fixed to the central portion of the bottom thereof and projecting into the space between the tires on said dual wheels as the chain passes about the respective dual wheels.

4. An antiskid chain according to claim 1 in which said road engaging portion and said tread engaging portion are integral with each other.

5. An antiskid chain according to claim 1 in which said connecting means are in the form of pin-like members extending through the respective frame and through the road engaging portion of the respective elastic means in the fore and aft direction thereof.

6. An antiskid chain according to claim 1 in which said road engaging portion extends beyond the limits of said frame in the fore and aft direction, said elastic means comprising strip portions extending inwardly along the front and back sides of said frame to the bottom thereof from the front and back ends of said road engaging portion, said tread engaging portion comprising two parts with one part extending beneath the bottom plate of said frame from the lower end of each said strip portion so the said tread engaging portion is integrally joined to said road engaging portion.

7. An antiskid chain according to claim 1 in which and flexible means are in the form of link chains.

8. An antiskid chain according to claim 7 in which the said element on each lateral end of each frame is an inwardly extending yoke to which the respective link chain is connected.

References Cited

UNITED STATES PATENTS

| 2,064,890 | 12/1936 | Dorst | 305—56 X |
| 2,162,700 | 6/1939 | Christmas | 305—35 |
| 2,376,802 | 5/1945 | Morse | 305—56 X |
| 2,821,443 | 1/1958 | Galanot | 305—56 |
| 2,973,995 | 3/1961 | Weir | 305—56 X |
| 3,093,423 | 6/1963 | Adams | 305—56 |
| 3,164,416 | 1/1965 | Hetteen | 305—56 X |
| 3,231,316 | 1/1966 | Ruf | 305—38 |

FOREIGN PATENTS

| 626,068 | 5/1927 | France. |
| 411,083 | 1934 | Great Britain. |
| 938,077 | 9/1963 | Great Britain. |
| 1,041,991 | 9/1966 | Great Britain. |

RICHARD J. JOHNSON, *Primary Examiner.*